United States Patent
Gaides et al.

(10) Patent No.: US 8,012,567 B2
(45) Date of Patent: Sep. 6, 2011

(54) LIGHT-COLLIMATING FILM

(75) Inventors: Gary E. Gaides, Woodbury, MN (US); Ignatius A. Kadoma, Cottage Grove, MN (US); David B. Olson, Marine on St. Croix, MN (US); Randy A. Larson, River Falls, WI (US); Anita R. Sykora, Menomonie, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1027 days.

(21) Appl. No.: 11/621,730

(22) Filed: Jan. 10, 2007

(65) Prior Publication Data

US 2007/0160811 A1  Jul. 12, 2007

Related U.S. Application Data

(60) Provisional application No. 60/743,124, filed on Jan. 12, 2006.

(51) Int. Cl.
*B32B 3/00* (2006.01)
*B32B 3/28* (2006.01)
*B32B 3/30* (2006.01)
*G02B 27/00* (2006.01)

(52) U.S. Cl. ........ 428/172; 428/156; 428/161; 428/163; 428/167; 428/173; 359/601; 359/614

(58) Field of Classification Search .................. 428/141, 428/156, 161, 163, 167, 168, 172, 173, 206, 428/207; 359/601, 613, 614
See application file for complete search history.

(56) References Cited

U.S. PATENT DOCUMENTS

| | | | |
|---|---|---|---|
| 4,621,898 A | | 11/1986 | Cohen |
| 5,204,160 A | * | 4/1993 | Rouser ........................ 428/167 |
| 5,521,726 A | * | 5/1996 | Zimmerman et al. ......... 349/96 |
| 5,629,445 A | | 5/1997 | Nakayama et al. |
| 5,635,278 A | * | 6/1997 | Williams ...................... 428/172 |
| 5,691,846 A | | 11/1997 | Benson, Jr. et al. |
| 5,805,358 A | | 9/1998 | Yamashita et al. |
| 5,817,376 A | | 10/1998 | Everaerts et al. |
| 5,888,649 A | * | 3/1999 | Curatolo et al. ............. 428/352 |
| 6,150,024 A | * | 11/2000 | Dhoot et al. .................. 428/421 |
| 6,164,785 A | * | 12/2000 | Maekawa ...................... 359/613 |
| 6,247,986 B1 | * | 6/2001 | Chiu et al. ...................... 445/24 |
| 6,288,136 B1 | | 9/2001 | Ukon et al. |
| 6,358,601 B1 | | 3/2002 | Bilkadi |

(Continued)

FOREIGN PATENT DOCUMENTS

JP   3049053   3/1991

(Continued)

OTHER PUBLICATIONS

Statement of IDS Cover, 2005.

(Continued)

*Primary Examiner* — David R Sample
*Assistant Examiner* — Catherine Simone
(74) *Attorney, Agent, or Firm* — Carolyn A. Fischer

(57) ABSTRACT

Light-collimating films as well as other microstructured film articles are described that comprise a (e.g. UV) cured light transmissive film comprising the reaction product of a polymerizable resin composition. Polymerizable resin compositions are also described that comprise aliphatic urethane (meth)acrylate oligomer(s), bisphenol-A ethoxylated diacrylate(s), and a crosslinker having at least three (meth) acrylate groups.

27 Claims, 4 Drawing Sheets

U.S. PATENT DOCUMENTS

| | | |
|---|---|---|
| 6,398,370 B1 * | 6/2002 | Chiu et al. .................... 359/613 |
| 6,577,358 B1 | 6/2003 | Arakawa et al. |
| 6,833,176 B2 | 12/2004 | Chisholm et al. |
| 6,903,788 B2 | 6/2005 | Shiraogawa et al. |
| 2002/0094417 A1 | 7/2002 | Phillips |
| 2002/0110667 A1 | 8/2002 | Kaufman |
| 2003/0027967 A1 | 2/2003 | Hori et al. |
| 2003/0114560 A1 | 6/2003 | Yang et al. |
| 2003/0175415 A1 | 9/2003 | Hayashi |
| 2004/0039078 A1 * | 2/2004 | Suh et al. ..................... 523/113 |
| 2004/0209020 A1 * | 10/2004 | Castiglione et al. ........... 428/34 |
| 2005/0128580 A1 * | 6/2005 | Olofson et al. ............... 359/443 |
| 2005/0213245 A1 * | 9/2005 | Katsura et al. ................ 360/125 |
| 2006/0286383 A1 * | 12/2006 | Gilmer ......................... 428/412 |
| 2007/0141329 A1 | 6/2007 | Yang et al. |

FOREIGN PATENT DOCUMENTS

| | | |
|---|---|---|
| JP | 6-305066 | 11/1994 |
| JP | 8286004 | 11/1996 |
| JP | 2003-43203 | 6/2003 |
| JP | 2003-172808 | 6/2003 |
| JP | 2003-240910 | 8/2003 |
| JP | 2004-77781 | 3/2004 |
| JP | 2006-84876 | 3/2006 |
| JP | 2006-85050 | 3/2006 |
| WO | WO 97/41463 | 11/1997 |
| WO | WO 98/01778 | 1/1998 |
| WO | WO 2004/033511 | 4/2004 |
| WO | WO 2005/007733 | 1/2005 |
| WO | 2005/062081 | 7/2005 |

OTHER PUBLICATIONS

Photomer products for UV/EB curing; Cognis, 2004.
Ucb Chemicals, Industrial Coatings Product Profile.
Sartomer, Product Catalog, 1999.
3M Computer Filters for Notebook and LCD Monitors, 1 page, printed Dec. 12, 2005.
Elecom, 2 pages.
Sartomer, Product Bulletin: SR-351, Trimethylolpropane Triactylate.
Sartomer, Product Bulletin: SR-238, 1, 6 Hexanediol Diacrylate.
Sartomer Application Bulletin; Performance Properties of Ethoxylated Bisphenol A Diacrylates, 3 pages.

* cited by examiner

LIGHT-COLLIMATING FILM

CROSS REFERENCE TO RELATED APPLICATIONS

This application claims the benefit of U.S. Provisional Application Ser. No. 60/743,124 filed Jan. 12, 2006.

BACKGROUND

Various light-collimating films are known. See for example U.S. Pat. Nos. 4,621,898; 5,204,160; and 6,398,370. Such light-collimating films typically include a light transmissive film having a plurality of parallel grooves wherein the grooves comprise a light-absorbing material.

Light-collimating films can be placed proximate a display surface, image surface, or other surface to be viewed. At normal incidence, (i.e. 0 degree viewing angle) where a viewer is looking at an image through the light-collimating film in a direction that is perpendicular to the film surface, the image is viewable. As the viewing angle increases, the amount of light transmitted through the light-collimating film decreases until a maximum viewing angle is reached where substantially all the light is blocked by the light-absorbing material and the image is no longer viewable. This can provide privacy to a viewer by blocking observation by others that are outside a typical range of viewing angles.

Light-collimating films prepared by molding and ultraviolet curing a polymerizable resin on a polycarbonate substrate are commercially available from 3M Company, St. Paul, Minn., under the trade designation "3M™ Filters for Notebook Computers and LCD Monitors".

Light-collimating films are also distributed by Elecom of Japan.

Industry would find advantage in light-collimating film prepared from alternative polymerizable resin compositions such as compositions that provide improved performance or processing advantages.

SUMMARY

Microstructured articles such as light-collimating films are described. The light-collimating films comprise a cured transparent film having a plurality of light absorbing elements.

In one embodiment, the (e.g. light-collimating) microstructured film comprises the reaction product of a polymerizable resin comprises at least a first and second polymerizable component selected from difunctional (meth)acrylate monomers, difunctional (meth)acrylate oligomers, and mixtures thereof.

In another embodiment, the cured transparent film is the reaction product of a polymerizable resin preferably having a viscosity of less than 50,000 cps at 25° C. and the cured transparent film comprises microstructures between light absorbing elements, the microstructures having an included wall angle of less than 6 degrees.

In another embodiment, the cured transparent film is disposed on a polyester film, the microstructures have an included wall angle of less than 6 degrees, and the light-collimating film has a stiffness of at least 65 N/mm or a thickness of less than 535 microns and a stiffness of at least 50 N/mm.

Each of these embodiments may further include any one or combination of various other features. In one aspect, the cured transparent film comprises microstructures (e.g. between light absorbing elements) and the microstructures have an average height, D, an average width at its widest portion, W, and D/W is at least 1.75. The microstructures may have an included wall angle of less than 6 degrees (e.g. less than 4 degrees). The light-collimating film preferably has a transmission at an incident angle of 0° of at least 56%. The polymerizable resin may comprise a first polymerizable component having a viscosity of at least about 5000 cps at 60° C. and a second polymerizable component has a viscosity no greater than about 75% or no greater than about 50% of the viscosity of the first polymerizable component. The first polymerizable component may be present at a ratio that ranges from 4:1 to 1:4 with respect to the second polymerizable component. The combination of the first and second polymerizable components may be present in an amount that ranges from about 50 wt-% to about 90% wt-% of the total polymerizable resin composition. The first polymerizable component may comprise an aliphatic urethane diacrylate oligomer. The first and/or second polymerizable component may comprise a bisphenol-A ethoxylated diacrylate. A homopolymer of the second polymerizable component preferably has an elastic tensile modulus as measured according to ASTM D5026-01 of less than $1 \times 10^8$ Pa at 25° C. and a homopolymer of the first polymerizable component preferably has a modulus at least $5 \times 10^7$ Pa at 25° C. greater than the homopolymer of the second polymerizable component.

In other embodiments, polymerizable resin compositions are described comprising at least about 20 wt-% of at least one aliphatic urethane(meth)acrylate oligomer; at least about 20 wt-% of at least one bisphenol-A ethoxylated diacrylate; and 2 wt-% to 25 wt-% of a crosslinker having at least three (meth)acrylate groups.

The crosslinker is preferably a liquid at ambient temperature. The composition may further comprise monofunctional (meth)acrylate diluent(s). The diluent is also preferably liquid at room temperature. In some aspects, the polymerizable composition is free of methacrylate functional monomer. In some embodiments, a homopolymer of the urethane oligomer polymerizable component has an elastic tensile modulus as measured according to ASTM D5026-01 of at least $1 \times 10^8$ Pa at 25° C. The urethane oligomer(s) may be present at a ratio that ranges from 4:1 to 1:4 with respect to the bisphenol-A ethoxylated diacrylate(s). This ratio may range from 3:1 to 1:2 or range from 1:1 to 1:4. The urethane oligomer in combination with the bisphenol-A ethoxylated diacrylate are present in an amount the ranges from about 50 wt-% to 75% wt-% of the total polymerizable resin composition.

DETAILED DESCRIPTION

Presently described are light-collimating films that comprise a (e.g. UV) cured light transmissive film comprising the reaction product of a polymerizable resin composition. Preferred polymerizable resin compositions are also described.

Such polymerizable resin compositions are surmised to have utility for the preparation of other light transmissive and/or microstructured film articles.

Figure 1:
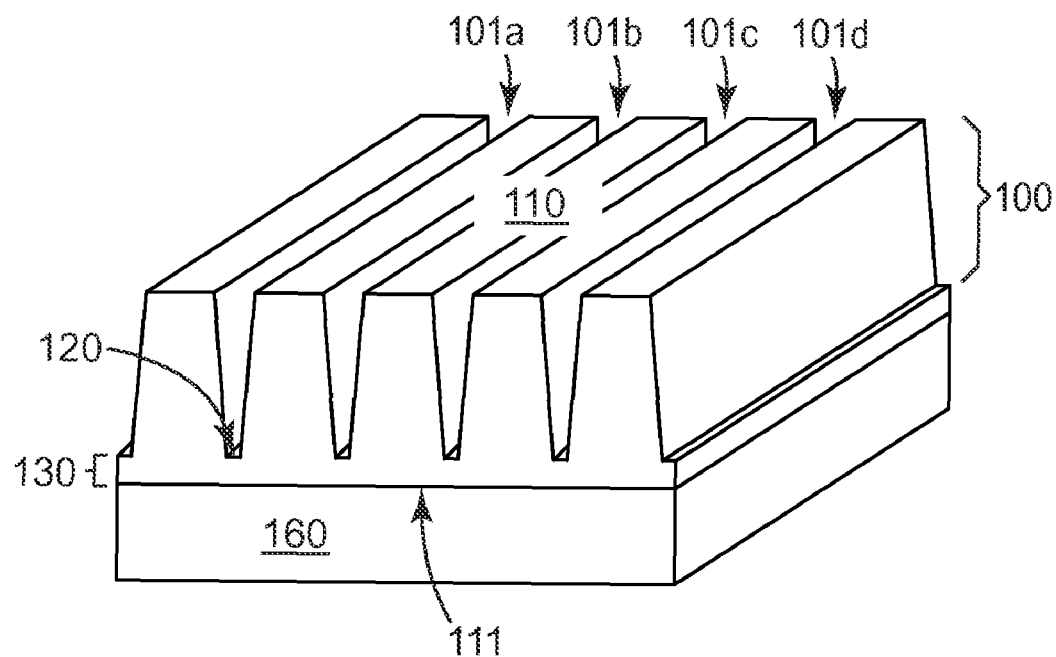
FIG. 1 is a perspective view of an exemplary microstructured article.

FIG. 1 shows an exemplary microstructured film article 100 comprising at least one microstructured surface 110. An embodied microstructured surface commonly employed for light-collimating films includes a plurality of grooves 101a-101b. As shown in FIG. 1, a continuous land layer 130 may be present between the base of the grooves 120 and the opposing (e.g. unstructured, substantially planar) surface 111 of the film 100. Alternatively, the grooves may extend all the way through the film. The microstructured article typically includes a base substrate layer 160.

Figure 2:
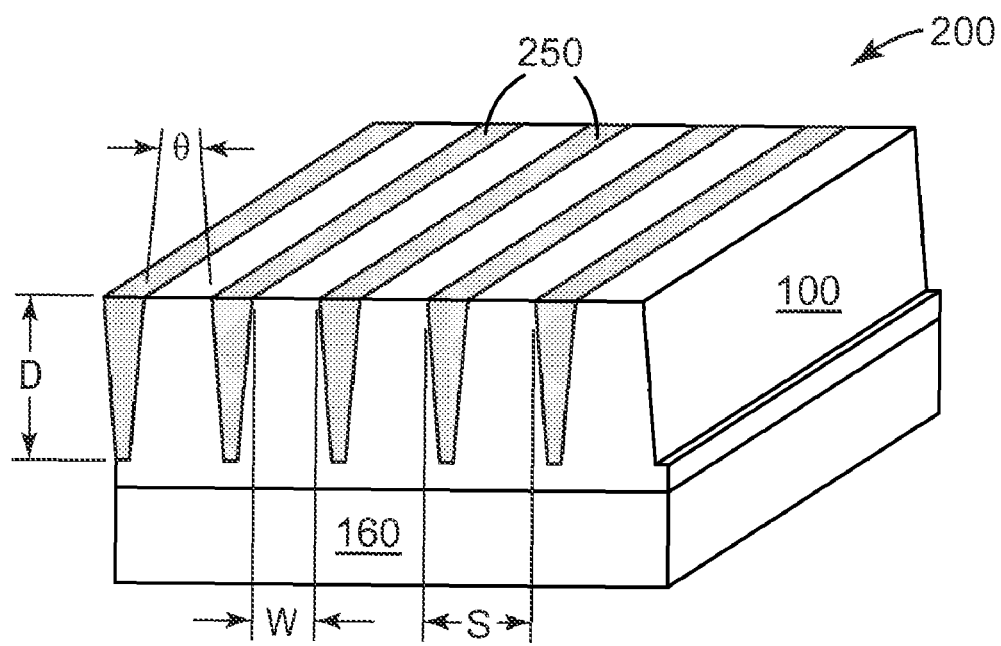
FIG. 2 is a perspective view of an exemplary light-collimating film.

FIG. 2 shows an embodied light-collimating film 200 wherein the grooves of FIG. 1 have been rendered light-absorbing by being filled with a light absorbing material 250. The light absorbing material in the shape of the recess of the (e.g. groove) microstructure is referred to herein as a light absorbing element.

Figure 3:
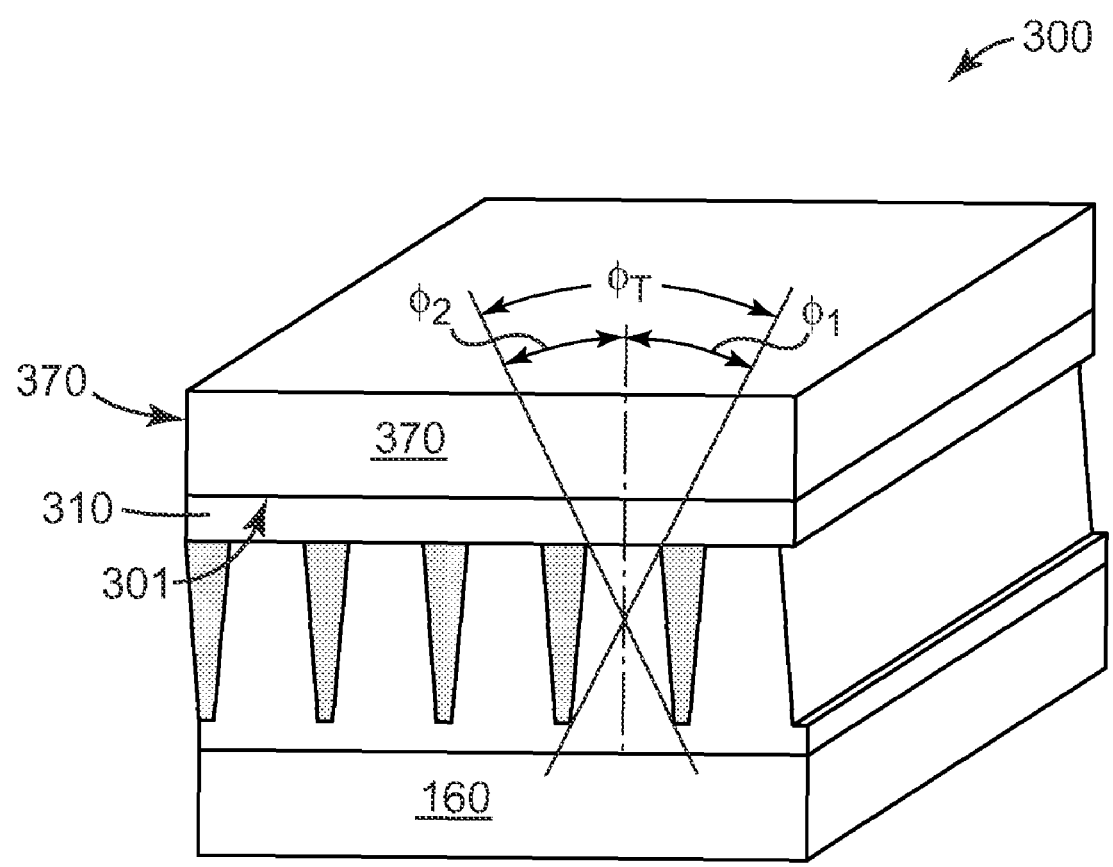
FIG. 3 is a perspective view of another exemplary-light-collimating film.

FIG. 3 shows another embodied light-collimating film 300 that further includes a cover film 370 that is typically the same film as the base substrate layer 160 bonded to the microstructured surface with for example an (e.g. UV-curable acrylate) adhesive 310.

As depicted in FIG. 2 or 3, the transparent microstructures between grooves have an included wall angle θ as depicted in FIG. 2, a maximum transparent microstructure width, W; an effective height D; center-to-center spacing, S; and a maximum viewing range $\Phi_T$. Wall angle θ is equal to 2 times the angle formed between the transparent film interface with the light absorbing element nearly along the "D" dimension direction and a plane normal to the microstructured surface. The viewing range $\Phi_T$ is about twice the maximum viewing half angle. The viewing range $\Phi_T$ can also be asymmetric for example when the half angle $\Phi_1$ is not equal to the half angle $\Phi_2$.

It is appreciated that transmission is a factor of the polymerizable resin of the light-collimating film as well as the included wall angle. In some embodiments, the transmission at an incident angle of 0° is at least 56%. The transmission at an incident angle of 0° can be at least 70% (e.g. 71%. 72%, 73%, 74%, 75%). The transmission can be measured with various known techniques. As used herein, the on-axis transmission was measured with an instrument commercially available from BYK Gardner under the trade designation "Haze-Guard Plus (catalog # 4725)."

Light-collimating films can be made that have relatively large included wall angles. Larger wall angles can increase the maximum width of the light absorbing regions, thereby decreasing the percent transmission at normal incidence.

In preferred embodiments, the included wall angle of the microstructures averages less than 6° and more preferably averages less than 5° (e.g. less than 4°, 3°, 2°, 1°, or 0°). Smaller (i.e. steeper) wall angles are amenable to producing grooves having a relatively high aspect ratio (D/W) at a smaller center-to-center spacing S, thereby providing a sharper image viewability cutoff at lower viewing angles. In some embodiments, the (e.g. transparent) microstructures have an average height, D, and an average width at its widest portion, W, and D/W is at least 1.75. In some embodiments, D/W is at 2.0, 2.5, 3.0 or greater.

Depending on the intended end use light collimating films having a variety of viewing cutoff angles can be prepared. In general, the viewing cutoff angle ranges from 40° to 90° or even higher. The following Table 1 provides exemplary viewing cutoff angles as a function of aspect ratio.

TABLE 1

| Aspect Ratio | View Angle (deg) |
|---|---|
| 1.50 | 120 |
| 1.75 | 100 |
| 2.0 | 90 |
| 3.0 | 60 |
| 4.0 | 48 |
| 5.0 | 40 |

For notebook computer privacy films and automatic teller machines, cutoff viewing angles are preferably less than 60°. However, for automotive and other uses cutoff viewing angles may range upwards of 100° to 120°.

Light absorbing materials useful for forming light absorbing regions in light collimating films of the present invention can be any suitable material that functions to absorb or block light at least in a portion of the visible spectrum. Preferably, the light absorbing material can be coated or otherwise provided in grooves or indentations in a light transmissive film to form light absorbing regions in the light transmissive film. Exemplary light absorbing materials include a black or other light absorbing colorant (such as carbon black or another pigment or dye, or combinations thereof) dispersed in a suitable binder. Other light absorbing materials can include particles or other scattering elements that can function to block light from being transmitted through the light absorbing regions.

The light absorbing material may comprise substantially the same polymerizable resin composition as the film with the exception of the inclusion of pigment or dye. The amount of (e.g. carbon black) colorant is typically at least about 2 wt-% and no greater than about 10 wt-%. One exemplary light absorbing composition is described in Example 3 of U.S. Pat. No. 6,398,370.

To reduce reflections at the light transmissive film/light absorbing material interface, it may be desirable to match or nearly match the index of refraction of the transmissive film material with the index of refraction of the light absorbing material over all or a portion of the visible spectrum. Accordingly the difference in the index of refraction of the cured transparent film in comparison to the (e.g. cured) light absorbing elements typically ranges from 0 to 0.002. Reducing such reflections tends to reduce the formation of ghost images.

Although the inclusion of a plurality of parallel light absorbing grooves is most common, the light-collimating film may alternatively include a plurality of light absorbing columns such as shown in FIG. 2b of U.S. Pat. No. 6,398,370; incorporated herein by reference. In addition, the light-collimating film described herein may be combined with a second light-collimating film, as also described in U.S. Pat. No. 6,398,370.

The light-collimating film may further other coatings typically provided on the exposed surface. Various hardcoats, antiglare coatings, antireflective coatings, antistatic, and antisoiling coatings are known in the art. See for example U.S. Publication Nos. 2006/0251885; 2005/0249957, PCT Publication Nos. WO2006/102383, WO2006/025992, WO2006/025956 and pending U.S. application Ser. No. 11/427,665, filed Jun. 29, 2006.

The polymerizable resin preferably comprises a combination of a first and second polymerizable component selected from difunctional (meth)acrylate monomers, difunctional (meth)acrylate oligomers, and mixtures thereof. As used herein, "monomer" or "oligomer" is any substance that can be converted into a polymer. The term "(meth)acrylate" refers to both acrylate and methacrylate compounds.

The polymerizable composition may comprise a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof.

In one embodiment, the components of the polymerizable resin are selected such that the polymerizable resin has a low viscosity. Providing a low viscosity polymerizable resin is amenable to increasing production rates. As used herein, viscosity was measured with a rheometric technique according to the test method described in the examples. The viscosity of the polymerizable resin composition is typically less than 50,000 cps at 25° C. Preferably, the viscosity is less than 25,000 cps at 25° C., and more preferably less than 15,000 cps at 25° C. (e.g. less than 12,000 cps, less than 11,000 cps, or less than 10,000 cps at 25° C.). The polymerizable resin composition has an even lower viscosity at elevated temperatures. For example the polymerizable resin may have a viscosity of less than 5000 cps, 4000 cps, 3000 cps, 2000 cps, and even less than 1000 cps at 60° C. Typically, the viscosity is at least 100 cps at 60° C.

In one embodiment, the microstructured (e.g. light-collimating) film is the reaction product of a polymerizable resin comprising at least two different (e.g. difunctional) polymerizable components. The components are preferably (meth)acrylate monomers, (meth)acrylate oligomers, or mixtures of at least one monomer and at least one oligomer. The first component and second components are typically each present in the polymerizable composition in an amount of at least about 20 wt-% (e.g. 30 wt-%, 35 wt-%, 40 wt-%, 45 wt-% and 50 wt-% and any amount between such stated values). The amount of any one of these components generally does not exceed about 70 wt-%.

Typically the ratio of the first polymerizable component to the second polymerizable component ranges from 4:1 to 1:4. In some embodiments, the ratio can range from 3:1 to 1:3 or can range from 2:1 to 1:2. Further, the combination of these two components typically ranges from about 50 wt-% to about 90% wt-% of the total polymerizable resin composition.

The first polymerizable component typically has a viscosity of at least about 5000 cps at 60° C. The second polymerizable component typically has viscosity less than the first polymerizable component. For example the second polymerizable component may have a viscosity of no greater than 25%, 30%, 35%, 40%, 45%, or no greater than 50% of the first polymerizable component.

The low viscosity polymerizable composition is preferably substantially solvent free. "Substantially solvent free" refer to the polymerizable composition having less than 1 wt-% and 0.5 wt-% of (e.g. organic) solvent. The concentration of solvent can be determined by known methods, such as gas chromatography. Solvent concentrations of less than 0.5 wt-% are preferred.

The kinds and amounts of polymerizable monomer and oligomers are preferably also selected to obtain certain elastic modulus criteria. In one embodiment, a difunctional (meth)acrylate monomer or oligomer is employed wherein the homopolymer of the monomer of oligomer has an elastic tensile modulus of less than $1 \times 10^8$ Pa at 80° F. (26.7° C.) as measured according to ASTM D5026-01. Such monomer or oligomer is combined with a different difunctional (meth)acrylate monomer or oligomer having an elastic tensile modulus of at least $1 \times 10^8$ Pa at 80° F. or greater. The difference in elastic modulus is typically at least $5 \times 10^7$ Pa at 80° F.

In some embodiments, the high elastic modulus component may have an elastic modulus of at least $2 \times 10^8$ Pa, $4 \times 10^8$ Pa, $6 \times 10^8$ Pa, $8 \times 10^8$ Pa, or at least $1 \times 10^9$ Pa at 80° F. The high modulus component typically has a tensile elastic modulus of no greater than $8 \times 10^9$ Pa at 80° F.

Polymerizable compositions having too high of an elastic modulus tend not to release from the tool during manufacturing; whereas compositions having too low of an elastic modulus tend to fail cohesively upon release from the mold tool.

Various kinds and amounts of polymerizable monomers and oligomers can be employed to provide compositions meeting any one or combination of the described transmission, viscosity, and elastic modulus criteria.

In one embodiment, a polymerizable resin composition is described comprising at least about 20 wt-% (e.g. aliphatic) urethane(meth)acrylate oligomer(s); and at least about 20 wt-% bisphenol-A ethoxylated diacrylate monomer(s).

The urethane(meth)acrylate oligomer(s) may be present in the polymerizable composition in an amount of at least about 20 wt-% (e.g. 25 wt-%, 30 wt-%, 35 wt-%, 40 wt-%, 45 wt-% and 50 wt-% and any amount there between). Typically, the amount of urethane(meth)acrylate oligomer does not exceed about 70 wt-%.

Likewise, the bisphenol-A ethoxylated diacrylate monomer(s) may be present in the polymerizable composition in an amount of at least about 20 wt-% (e.g. 25, wt-%, 30 wt-%, 35 wt-%, 40 wt-%, 45 wt-% and 50 wt-% and any amount there between). Typically, the amount of monomer of bisphenol-A ethoxylated diacrylate monomer(s) does not exceed about 70 wt-%.

Typically the ratio of urethane(meth)acrylate oligomer(s) to bisphenol-A ethoxylated diacrylate monomer(s) ranges from 4:1 to 1:4. In some embodiments, this ratio is 3:1 to 1:2 or 1 to 1.4.

One exemplary (e.g. aliphatic) urethane diacrylate is commercially available from Cognis under the trade designations "Photomer 6010" (reported to have a viscosity of 5,900 mPa·s at 60° C., elongation of 45% and a Tg of −7° C.). Other urethane diacrylates having a low viscosity that may also be suitable include for example "Photomer 6217" and "Photomer 6230" (both reported to have a viscosity of 3,500 mPa·s at 60° C., an elongation of 27% and 69% respectively, and a Tg of 35° C. and 2° C. respectively); "Photomer 6891" (reported to have viscosity of 8,000 mPa·s at 60° C., elongation of 60% and a Tg of 28° C.); and "Photomer 6893-20R" (reported to have a viscosity of 2,500 mPa·s at 60° C., an elongation of 42%, and a Tg of 41° C.). It is surmised that use of a urethane(meth)acrylate having a higher Tg (i.e. above that of Photomer 6010) may be blended with a second polymerizable monomer having a homopolymer with a Tg lower than 60° C. (i.e. the Tg of SR602). Other urethane diacrylates are commercially available from Sartomer as well as from UCB.

One exemplary bisphenol-A ethoxylated diacrylate monomer is commercially available from Sartomer under the trade designations "SR602" (reported to have a viscosity of 610 cps at 20° C. and a Tg of 2° C.).

In another embodiment, a polymerizable resin composition is described comprising at least about 40 wt-% bisphenol-A ethoxylated diacrylate monomer(s). A first bisphenol-A ethoxylated diacrylate monomer, such as SR 602, combined with a second bisphenol-A ethoxylated diacrylate monomer, such as commercially available from Sartomer under the trade designations "SR601" (reported to have a viscosity of 1080 cps at 20° C. and a Tg of 60° C.). A homopolymer of the first bisphenol-A ethoxylated diacrylate monomer has a different Tg that the homopolymer of the second bisphenol-A ethoxylated diacrylate monomer. The first bisphenol-A ethoxylated diacrylate monomer has a Tg below 25° C. (e.g. less than 20° C., 15° C., 10° C., or even 0° C.) whereas the second bisphenol-A ethoxylated diacrylate monomer has a Tg above 25° C. (e.g. 30° C., 35° C., 40° C., 45° C., 50° C., or even 55° C. The difference is Tg of the homopolymers of the first and second bisphenol-A ethoxylated diacrylate monomer is typically at least 20° C., 30° C., 40° C., or even 50° C.

The first and second bisphenol-A ethoxylated diacrylate monomers are each typically present in the polymerizable composition in an amount of at least about 20 wt-% (e.g. 25 wt-%, 30 wt-%, 35 wt-%, 40 wt-%, 45 wt-% and 50 wt-% and any amount there between) with the proviso that the total amount of bisphenol-A ethoxylated diacrylate monomer typically does not exceed about 90 wt-%.

The ratio of the first to second bisphenol-A ethoxylated diacrylate monomer may range from 3:1 to 1:3. In some embodiments, this ratio is about 2 to 1.

Other difunctional (meth)acrylate monomers that may be employed in the polymerizable composition include for example triethylene glycol di(meth)acrylate, ethylene glycol di(meth)acrylate, tetraethylene glycol di(meth)acrylate, polyethylene glycol di(meth)acrylate; 1,3-butylene glycol di(meth)acrylate; 1,4-butanediol di(meth)acrylate; diethylene glycol di(meth)acrylate; and 1,6-hexanediol di(meth)acrylate.

The polymerizable resin optionally, yet preferably further comprises at least one crosslinker having three or more (meth)acrylate groups. When a crosslinker is present, it is preferably present in the polymerizable composition in an amount of at least about 2 wt-%. Typically, the amount of crosslinker is not greater than about 25 wt-%. The crosslinking agent may be present in any amount ranging from about 5 wt-% to about 15 wt-%.

Suitable crosslinkers include for example, pentaerythritol tri(meth)acrylate, pentaerythritol tetra(meth)acrylate, trimethylolpropane tri(meth)acrylate, dipentaerythritol penta(meth)acrylate, dipentaerythritol hexa(meth)acrylate, trimethylolpropane ethoxylate tri(meth)acrylate, glyceryl tri(meth)acrylate, pentaerythritol propoxylate tri(meth)acrylate, and di-trimethylolpropane tetra(meth)acrylate. Any one or combination of crosslinkers may be employed. Since methacrylate groups tend to be less reactive than acrylate groups, the crosslinker(s) are preferably free of methacrylate functionality.

Various crosslinkers are commercially available. For example, pentaerythritol triacrylate (PETA) and dipentaerythritol pentaacrylate are commercially available from Sartomer Company, Exton, Pa. under the trade designations "SR444" and "SR399LV" respectively. PETA is also available from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) and ditrimethylol propane tetraacrylate (di-TMPTA) are commercially available from Sartomer Company under the trade designations "SR351" and "SR355". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

The polymerizable composition may optionally include a (e.g. monofunctional) reactive diluent, for example having a number average molecular weight no greater than 450 g/mole. When present, the amount of reactive diluent may range from 1 wt-% to about 10 wt-%. Suitable reactive diluents include for example allyl(meth)acrylate, tetrahydrofurfuryl(meth)acrylate, isodecyl(meth)acrylate, 2(2-ethoxythoxy) ethyl (meth)acrylate, stearyl(meth)acrylate, lauryl (meth)acrylate, 2-phenoxyethyl (meth)acrylate, gylcidyl (meth)acrylate, isobornyl(meth)acrylate, isooctyl(meth)acrylate, tridecyl(meth)acrylate, caprolactone(meth)acrylate, propoxylated allyl(meth)acrylate, methoxy polyethylene glycol monomethacylate, ethoxylated hydroxymethyl (meth)acrylate, polypropylene glycol monomethacylate, alkoxylated tertahydrofurfuryl (meth)acrylate, and ethoxylated nonyl phenol(meth)acrylate.

Radiation (e.g. UV) curable compositions generally include a least one photoinitiator. The photoinitiator or combination of photoiniators can be used at a concentration of about 0.1 to about 10 weight percent. More preferably, the photoinitiator or combination thereof is used at a concentration of about 0.2 to about 3 wt-%. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoydiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

Free radical scavengers or antioxidants may be used, typically, at about 0.01 to 0.5 weight percent. Illustrative examples of suitable antioxidants include hindered phenolic resins such as those available under the trade designations "Irganox 1010", "Irganox 1076", "Irganox 1035", and "Irgafos 168" from Ciba-Geigy Corp.

As described in Lu and Lu et al., a microstructure-bearing article (e.g. brightness enhancing film) can be prepared by a method including the steps of (a) preparing a polymerizable composition (i.e. the polymerizable composition of the invention); (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The deposition temperature can range from ambient temperature, (i.e. 25° C.) to 180° F. (82° C.). The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

The particular chemical composition and thickness of the base material for any optical product can depend on the requirements of the particular optical product that is being constructed. That is, balancing the needs for strength, clarity, temperature resistance, surface energy, adherence to the optical layer, among others. The thickness of the base layer is typically at least about 0.025 millimeters (mm) and more typically at least about 0.125 mm. Further, the base layer generally has a thickness of no more than about 0.5 mm.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base material can contain mixtures or combinations of these materials. In an embodiment, the base may be multi-layered or may contain a dispersed component suspended or dispersed in a continuous phase.

Examples of preferred base materials include polyethylene terephthalate (PET) and polycarbonate. Examples of useful PET films include photograde polyethylene terephthalate and available from DuPont Films of Wilmington, Del. under the trade designation "Melinex 618".

PET can be a preferred base material in comparison to polycarbonate. For example, when a (e.g. 175 micron) PET film material having a stiffness of 5.5 N/mm is employed rather than a (e.g. 179 micron) polycarbonate film of substantially the same thickness having a stiffness of 3.4 N/mm, the resulting light-collimating film exhibits imcreased stiffness. Increased stiffness can enable the film to function better when used in larger format displays (e.g. desktop monitors and larger notebook display monitors) at equivalent thickness. In some embodiments, the stiffness of the (e.g. light-collimating) microstructured film artilce as measured according to the test method described in the examples is at least 65 N/mm (e.g. 66 N/mm, 67 N/mm, 68 N/mm, 69 N/mm, 70 N/mm), at least 75 N/mm, at least 80 N/mm, at least 85 N/mm, or at least 90 N/mm. Alternatively, equivalent stiffness can be achieved at reduced caliper. Product thickness is important in certain design applications where limited space is available for placement of the light collimating film (e.g. in the bezel of a notebook display). Accordingly, in some embodiments, the (e.g. light-collimating) microstructured film has a thickness of 535 microns or less, yet the stiffness is at least 50 N/mm (e.g. any integer from 50 N/mm to 90 N/mm).

The polymerizable resin compositions described herein is surmised suitable for use in the manufacture of other light transmissive and/or microstructured articles including for example brightness enhancing films and molds for use in the manufactures of cells of a (e.g. plasma) display. The term "microstructure" is used herein as defined and explained in U.S. Pat. No. 4,576,850. Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g., from +/−0.005 +/−0.1 or, preferably, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120, each of which are incorporated herein by reference. The use of these polarizer films in combination with a brightness enhancement film has been described in U.S. Pat. No. 6,111,696, incorporated by reference herein.

A second example of a polarizing film that can be used as a base are those films described in U.S. Pat. No. 5,882,774, also incorporated herein by reference. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488, incorporated herein by reference.

This list of base materials is not exclusive, and as will be appreciated by those of skill in the art, other polarizing and non-polarizing films can also be useful as the base for the optical products of the invention. These base materials can be combined with any number of other films including, for example, polarizing films to form multilayer structures. Additional base materials include those films described in U.S. Pat. Nos. 5,612,820 and 5,486,949. The thickness of a particular base can also depend on the above-described requirements of the optical product.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

TABLE 2

Trade Designation (Supplier, Location)—Generic Chemical Description

SR 351 (Sartomer, Extom Pa.)—trimethylolpropane triacrylate (TMPTA)
SR 602 (Sartomer, Extom Pa.)—bisphenol A diacrylate with about four moles of ethoxylation
SR 601 (Sartomer, Extom Pa.)—bisphenol A diacrylate with about ten moles of ethoxylation
SR 339 (Sartomer, Extom Pa.)—2-phenoxyethyl acrylate
SR 238 (Sartomer, Extom Pa.)—1,6-hexanediol diacrylate
1-12-Dodecanediol diacrylate (DDDDA) can be obtained from UBE Industries of Japan
CN120 (Sartomer, Extom Pa.)—difunctional bisphenol A based epoxy acrylate
Photomer 6010 (Cognis)—aliphatic urethane diacrylate
Photomer 6210 (Cognis)—aliphatic urethane diacrylate

TABLE 3

Polymerizable Resin Compositions

| Sample Description | 1st component | $2^{nd}$ component | 3rd component | 4th component | 5th component |
|---|---|---|---|---|---|
| Example 1 | 10% SR351 | 57% SR602 | 28% SR601 | 5% SR339 | none |
| Example 2 | 5% SR351 | 80% DDDDA | 10% CN120 | 5% SR339 | none |
| Example 3 | 75% Photomer 6210 | 25% SR238 | 1% Daracur 1173 photoinitiator | none | none |
| Example 4 | 45% Photomer 6010 | 36.7% SR602 | 7.1% SR238 | 7.1% SR351 | 4.1% SR339 |

Resin formulations #1, 2, and 4 had 0.4% TPO photoinitiator added.

Comparative Example A ("Comp A")—is the polymerizable resin employed to make the microstructured light transmissive film of a light-collimating film commercially available from 3M Company, St. Paul, Minn. under the trade designation "3M™ Filters for Notebook Computers and LCD Monitors".

Comparative Example B ("Comp B")—a light-collimating film distributed by Elecom, Japan.

Viscosity of Polymerizable Resin

Figure 4:
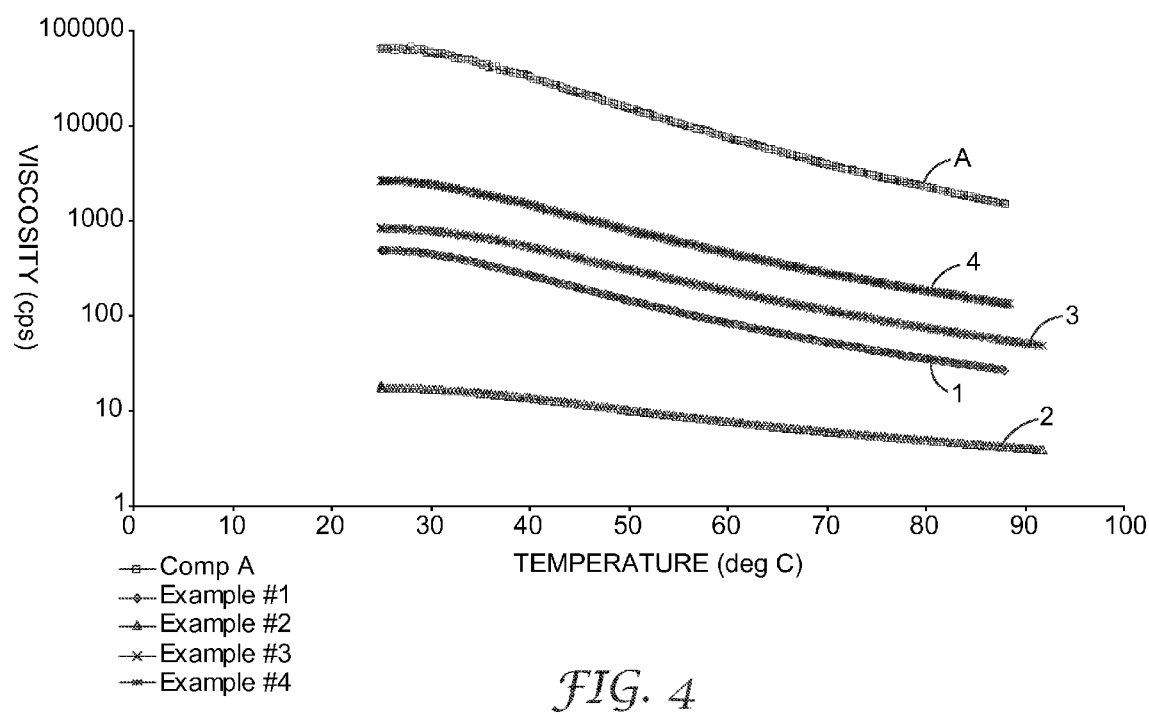
FIG. 4 is a plot of viscosity vs. temperature for polymerizable resin compositions.

FIG. 4 depicts the viscosity of the uncured polymerizable resin compositions of Table 3 and Comp A as determined with a rheometer commercially available from TA instruments under the trade designation "Advanced Rheometer 2000". A constant shear stress of 1 Pa over a temperature range 25-98 oC was applied to each sample in a couette fixture. Data generated was viscosity (cps) as a function of temperature (oC).

Preparation of Unstructured Films

Figure 5:
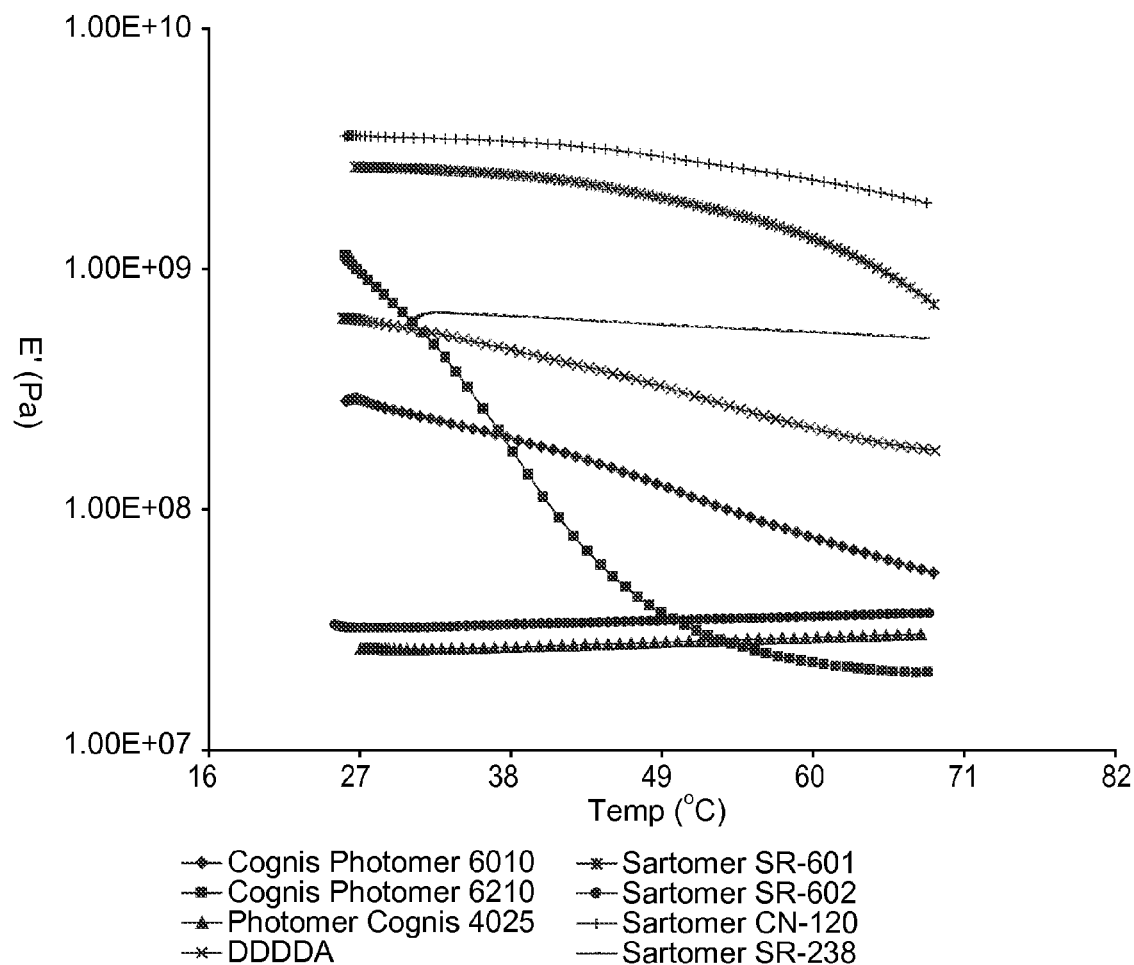
FIG. 5 is a plot of elastic modulus vs. temperature of the homopolymers of various polymerizable components.

Thin unstructured films were prepared from the homopolymers of the various polymerizable (meth)acrylate monomers and oligomers described in FIG. 5 in combination with 0.4 wt-% "Lucirin TPO" or "Lucirin TPO-L" photoinitiator.

Thin "hand spread" coatings of each monomer were made using a precision laboratory drawdown coater. Hand pours were made between two pieces of unprimed PET film. Approximately 8 to 10 mils thick films were made using a precision laboratory draw down coater (manufactured by ChemInstruments). The uncured resin was then exposed to UV radiation (2 passes, 25 feet per minute, one-side exposure with a Fusion D bulb) to cure the polymerizable resin.

Homopolymer Elastic Modulus

The elastic modulus of each of the homopolymer film samples was measured using a dynamic tensile deformation test according to ASTM D 5026-01. FIG. 5 depicts the elastic modulus vs. temperature response of the homopolymers of various polymerizable ingredient employed in the examples.

Preparation of Microstructured Films

Structured films were made by molding and ultraviolet (UV) light curing each of the transparent, photo-polymerizable compositions of Table 3 on either a 0.005" gauge, chemically primed PET substrate film or 0.007" polycarbonate film substrate. For these structured films a cylindrically-shaped metal roll with finely detailed channels cut into its outer surface served as the mold. The resinous mixture was first introduced onto either PET or PC substrate film and then pressed firmly against the metal roll in order to completely fill the mold. Upon polymerization the structured film was removed from the mold. The resulting structure in the cured resin was a series of evenly spaced channels, each having a nominally rectangular cross-section. The cured resin channels were about 48 microns wide, about 146 microns deep, and spaced at about a 70 micron pitch. FIG. 1 is representative of such a structured film.

EXAMPLE #1

Exemplifies a polymerizable resin composition having a lower viscosity than Comparative A. Example 1 comprises a mixture of a first diacrylate (SR601) having a homopolymer with an elastic modulus greater than Comp A in combination with a second diacrylate (SR602) having a homopolymer with an elastic modulus less than Comp A. The cured resin of Example 1 was able to release from the mold after curing.

EXAMPLE #2

Exemplifies a polymerizable resin composition also having a lower viscosity than Comparative A. Example 2 comprises DDDDA and CN120, each having a homopolymer with an elastic modulus greater than Comp A. The cured resin of Example 2 was unable to release from the mold after curing. The inability of the cured resin to release from the mold is surmised attributed to the increased elastic modulus.

EXAMPLE #3

Exemplifies a polymerizable resin composition also having a lower viscosity than Comparative A. Example 3 comprises 75% Photomer 6210, having a homopolymer with an elastic modulus less than Comp A. The cured resin cohesively failed upon release from the mold. This lack of cohesive strength is surmised attributed to the decreased elastic modulus.

EXAMPLE #4

Exemplifies a polymerizable resin composition having a lower viscosity than Comparative A. Example 4 comprises a mixture of a first diacrylate (Photomer 6010) the same homopolymer employed in Comp A. Example 4 further includes a second diacrylate (SR602) having a homopolymer with an elastic modulus less than Comp A. The cured resin of Example 4 released from the mold after curing.

EXAMPLE #5

A carbon black loaded, photo-polymerizable mixed acrylate resin (substantially the same as described in Example 3 of U.S. Pat. No. 6,398,370) was then filled into the air gaps between the transparent channels of the structured film of Example #4. Excess black-containing resin was wiped from the outward-facing surfaces of the transparent channels. The carbon black filled channels were then cured using UV radiation, resulting in a light-collimating film similar to that shown in FIG. 2.

EXAMPLE #6

The light collimating film just described was then laminated to a 0.005" gauge primed PET coversheet using UV-curable mixed acrylate resin system. A BYK Gardner Haze-Guard Plus was used to measure the on-axis transmission. An average of 5 measurements is reported.

The on-axis transmission of Example 6 was 64.9%.

The on-axis transmission of Comp B was 53.3%. The on-axis transmission of a privacy filter commercially available from 3M under the trade designation "3M™ Filters for Notebook Computers and LCD Monitors" was 64.5%.

Included Wall Angle

Plan view Reflected Brightfield (RBF) images were taken using a Zeiss Axioplan equipped with Leica DC 300 and Image J software showing the louver pitch of the back side using a 20×/0.50 objective and calibration of 3.724 pixels/micron. 40 micron thin cross-sections were cut using a diamond knife on a LKB Historange. Cross-section images were takes using a 40×/0.75 objective and 7.638 pixels/micron calibration.

The average of 10 measurements of the included wall angle, θ, of Comp B was 6.90 with a standard deviation of 0.63.

The average of 10 measurements of the included wall angle, θ, of Example 6 was 1.90 with a standard deviation of 0.05. The included wall angle, θ, of "3M™ Filters for Notebook Computers and LCD Monitors" is substantially the same as Example 6 since the same tool was used.

EXAMPLE #7

A structured film was made by molding and UV light curing a photo-polymerizable resin against a 0.005" gauge, chemically primed PET substrate film. The composition of the resin system is the same as that used in Example #4 except for the addition of 0.2 wt-% Irganox 1035 (Ciba Chemicals) antioxidant to the resin. Color measurements for Example #4 and #7 structured films are shown as follows before and after accelerated weathering of the films.

| Color Change of Microstructured Films (1000-hrs at 105° C.) | | | | | | |
|---|---|---|---|---|---|---|
| | Initial - before weathering | | After 1000-hours at 105° C. | | color change | |
| | x-color | y-color | x-color | y-color | x-color | y-color |
| Example 4 | 0.3148 | 0.3322 | 0.3203 | 0.3396 | 0.0055 | 0.0074 |
| Example 7 | 0.3148 | 0.3322 | 0.3155 | 0.3332 | 0.0007 | 0.001 |

The elastic modulus and hardness of the cured compositions of Examples 1-4 can be tested according to the following test method.

Stiffness

Stiffness measurements were made using an Instron Advanced Materials Testing System modified in a manner similar to ASTM D790-03. The modified system included a PC driven load frame with a 50 N load cell and a 3-point flexure fixture. The present 3-point flexure test fixture had lower and upper support anvil diameters of 4 mm and 10 mm respectively. Samples were cut to known widths of 25.00+/−0.25 mm. Sample thickness was measured to the nearest micrometer at three different locations. Each sample was tested three times at a cross-head speed of 5.0 mm/min. An average value was determined.

The stiffness of two different samples was measured as just described. The first sample was a microstructured light-collimating film commercially available from 3M Company, St. Paul, Minn. under the trade designation "3M™ Filters for Notebook Computers and LCD Monitors", which includes a 179 micron polycarbonate film base material and a UV cured adhesive at a thickness of about 1 mil.

The second microstructured light-collimating film was prepared from a polymerizable resin similar in composition and having the same modulus as that described in Example 4, a 175 micron PET film base material ("Melinex 618") coated with the UV cured adhesive described in Example 25 of U.S. Publication No. 2006/0029784 at a thickness of about 1 mil.

The resin of the commercially available light collimating film "Comparative Example A" was found not to adequately adhere to PET base materials.

The PET-based sample had a thickness of 529 microns and an average stiffness of 87.3 N/mm. The PC-based sample has a thickness of 540 microns and an average stiffness of 57.5 N/mm.

What is claimed is:

1. A light-collimating film comprising a cured transparent film having a plurality light-absorbing elements wherein the cured transparent film is the reaction product of a polymerizable resin comprising first and second polymerizable components selected from an aliphatic urethane diacrylate oligomer and a bisphenol-A ethoxylated diacrylate or bisphenol-A ethoxylated diacrylates; and a crosslinker having at least three (meth) acrylate groups; wherein a homopolymer of the second polymerizable component has an elastic tensile modulus as measured according to ASTM D5026-01 of less than $1 \times 10^8$ Pa at 25° C. and a homopolymer of the first polymerizable component has a modulus at least $5 \times 10^7$ Pa at 25° C. greater than the homopolymer of the second polymerizable component.

2. The light-collimating film of claim 1 wherein the first polymerizable component has a viscosity of at least about 5000 cps at 60° C. and the second polymerizable component has a viscosity no greater than about 75% of the viscosity of the first polymerizable component.

3. The light-collimating film of claim 2 wherein the second polymerizable component has a viscosity of no greater than 50% of the viscosity of the first polymerizable component.

4. The light-collimating film of claim 1 the first polymerizable component is present at a weight ratio that ranges from 4:1 to 1:4 with respect to the second polymerizable component.

5. The light-collimating film of claim 1 wherein the combination of first and second polymerizable components are present in an amount that ranges from about 50 wt-% to about 90% wt-% of the total polymerizable resin composition.

6. The light-collimating film of claim 1 wherein the light absorbing elements comprises a cured polymerizable resin including a light absorbing colorant.

7. The light-collimating film of claim 6 wherein the cured transparent film and the light absorbing elements each have a refractive index that differ by an amount ranging from 0 to 0.002.

8. The light-collimating film of claim 1 wherein the cured transparent film comprises microstructures between the light absorbing elements and the microstructures have an average height, D, an average width at its widest portion, W, and D/W is at least 1.75.

9. The light-collimating film of claim 1 wherein the cured transparent film comprises microstructures between the light absorbing elements, the microstructures having an included wall angle of less than 6 degrees.

10. The light-collimating film of claim 9 wherein the microstructures have an included wall angle of less than 4 degrees.

11. The light-collimating film of claim 1 wherein the light-collimating film has a transmission at an incident angle of 0° of at least 56%.

12. The light-collimating film of claim 1 wherein the polymerizable resin has a viscosity of less than 50,000 cps at 25° C.

13. The light-collimating film of claim 1 wherein the cured transparent film is disposed on a polyester film.

14. The light-collimating film of claim 13 wherein the light-collimating film has a stiffness of at least 65 N/mm.

15. The light-collimating film of claim 13 wherein the light-collimating film has a thickness of less than 535 microns and a stiffness of at least 50 N/mm.

16. A light-collimating film comprising a cured transparent film having a plurality of light absorbing elements wherein the cured transparent film is the reaction product of a polymerizable resin having a viscosity of less than 50,000 cps at 25° C. and the cured transparent film comprises microstructures between the light absorbing elements, the microstructures having an included wall angle of less than 6 degrees.

17. A light-collimating film comprising a cured transparent film having a plurality of light absorbing elements wherein the cured transparent film is disposed on a polyester film and the cured transparent film comprises microstructures between the light absorbing elements, the microstructures having an included wall angle of less than 6 degrees and the light-collimating film having a stiffness of at least 65 N/mm or a thickness of less than 535 microns and a stiffness of at least 50 N/mm.

18. The light-collimating film of claim 16 wherein the microstructures have an average height, D, an average width at its widest portion, W, and D/W is at least 1.75.

19. The light-collimating film of claim 16 wherein the microstructures have an included wall angle of less than 4 degrees.

20. The light-collimating film of claim 16 wherein the microstructures comprise the reaction product of a polymerizable resin comprising a first and second polymerizable components selected from difunctional (meth)acrylate monomers, difunctional (meth)acrylate oligomers, and mixtures thereof and a crosslinker having at least three (meth)acrylate groups.

21. The light-collimating film of claim 20 wherein the first polymerizable component and second polymerizable components are present in an amount that ranges from about 50 wt-% to about 90% wt-% of the total polymerizable resin composition.

22. The light-collimating film of claim 20 wherein the first polymerizable component comprises an aliphatic urethane diacrylate oligomer and the second polymerizable component comprises a bisphenol-A ethoxylated diacrylate.

23. The light-collimating film of claim 17 wherein the microstructures have an average height, D, an average width at its widest portion, W, and D/W is at least 1.75.

24. The light-collimating film of claim 17 wherein the microstructures have an included wall angle of less than 4 degrees.

25. The light-collimating film of claim 17 wherein the microstructures comprise the reaction product of a polymerizable resin comprising a first and second polymerizable components selected from difunctional (meth)acrylate monomers, difunctional (meth)acrylate oligomers, and mixtures thereof and a crosslinker having at least three (meth)acrylate groups.

26. The light-collimating film of claim 25 wherein the first polymerizable component and second polymerizable components are present in an amount that ranges from about 50 wt-% to about 90% wt-% of the total polymerizable resin composition.

27. The light-collimating film of claim 25 wherein the first polymerizable component comprises an aliphatic urethane diacrylate oligomer and the second polymerizable component comprises a bisphenol-A ethoxylated diacrylate.

* * * * *

UNITED STATES PATENT AND TRADEMARK OFFICE
CERTIFICATE OF CORRECTION

| | | |
|---|---|---|
| PATENT NO. | : 8,012,567 B2 | Page 1 of 1 |
| APPLICATION NO. | : 11/621730 | |
| DATED | : September 6, 2011 | |
| INVENTOR(S) | : Gary E Gaides | |

It is certified that error appears in the above-identified patent and that said Letters Patent is hereby corrected as shown below:

<u>Page 2, Column 2 (Other Publications)</u>
Line 8, Delete "Triactylate." and insert -- Triacrylate. --, therefor.

<u>Column 9</u>
Line 35, Delete "imcreased" and insert -- increased --, therefor.
Line 40, Delete "artilce" and insert -- article --, therefor.

<u>Column 15</u>
Line 4, In Claim 4, after "claim 1" insert -- wherein --.

Signed and Sealed this
Eighteenth Day of October, 2011

David J. Kappos
*Director of the United States Patent and Trademark Office*